(12) United States Patent
Evans et al.

(10) Patent No.: US 11,007,912 B2
(45) Date of Patent: May 18, 2021

(54) ENERGY ATTENUATING VEHICLE SEAT ASSEMBLY

(71) Applicant: Pratt & Miller Engineering and Fabrication, Inc., New Hudson, MI (US)

(72) Inventors: Celyn M. Evans, Milford, MI (US); Kevin Kwiatkowski, Ann Arbor, MI (US)

(73) Assignee: PRATT & MILLER ENGINEERING AND FABRICATION, INC., New Hudson, MI (US)

( * ) Notice: Subject to any disclaimer, the term of this patent is extended or adjusted under 35 U.S.C. 154(b) by 78 days.

(21) Appl. No.: 16/251,518

(22) Filed: Jan. 18, 2019

(65) Prior Publication Data

US 2020/0231073 A1 Jul. 23, 2020

(51) Int. Cl.
*B60N 2/42* (2006.01)
*B60N 2/427* (2006.01)

(52) U.S. Cl.
CPC ....... *B60N 2/42745* (2013.01); *B60N 2/4214* (2013.01); *B60N 2/42772* (2013.01)

(58) Field of Classification Search
CPC .............. B60N 2/42745; B60N 2/4214; B60N 2/42772
USPC ..................................................... 297/216.13
See application file for complete search history.

(56) References Cited

U.S. PATENT DOCUMENTS

| | | | |
|---|---|---|---|
| 2,425,632 A | 8/1947 | Morey et al. | |
| 2,772,065 A | 11/1956 | Thomas | |
| 2,869,685 A | 1/1959 | Funkhouser et al. | |
| 3,127,958 A | 4/1964 | Szostak | |
| 3,184,011 A | 5/1965 | Pollock | |
| 3,236,512 A | 2/1966 | Kirsch et al. | |
| 3,459,395 A | 8/1969 | Scotto | |
| 4,509,621 A | 4/1985 | Desjardins et al. | |
| 5,273,240 A | 12/1993 | Sharon | |
| 5,558,301 A | 9/1996 | Kerdoncuff et al. | |
| 5,699,984 A | 12/1997 | Pinault | |
| 5,758,859 A | 6/1998 | Gonzalez | |
| 5,788,185 A | 8/1998 | Hooper | |
| 5,810,125 A | 9/1998 | Gezari | |

(Continued)

FOREIGN PATENT DOCUMENTS

| | | |
|---|---|---|
| EP | 0 814 020 A2 | 12/1997 |
| EP | 1 197 429 A2 | 4/2002 |
| EP | 2 813 430 A1 | 12/2014 |

*Primary Examiner* — Mark R Wendell
(74) *Attorney, Agent, or Firm* — Dickinson Wright PLLC (57) ABSTRACT

In one embodiment there is disclosed an energy attenuating vehicle seat. The seat includes a seat back pivotally connected to a seat pan, the seat back and the seat pan independently pivotal. At the pivot between the seat back and the seat pan there is a rotary energy attenuation device. The device extends between the seat back longitudinal members and the seat pan longitudinal members and is pivotally attached to the seat pan and the seat back allowing individual adjustment of the back or pan. The rotary energy attenuating device cooperates with a track system along the length of seat longitudinal members allowing for different directions of travel and height adjustment. The vehicle seat offers passive or active protection from impact and sudden acceleration (G force and Pressure Wave) due to accident or explosive events and is capable of automatically resetting.

34 Claims, 5 Drawing Sheets

(56) References Cited

U.S. PATENT DOCUMENTS

| | | | |
|---|---|---|---|
| 5,842,669 A | 12/1998 | Ruff | |
| 5,984,349 A | 11/1999 | Voorhies | |
| 6,047,797 A | 4/2000 | Popjoy | |
| 6,074,004 A | 6/2000 | Carmichael | |
| 6,206,153 B1 | 3/2001 | Popjoy | |
| 6,264,159 B1 | 7/2001 | Su | |
| 6,267,440 B1 | 7/2001 | Hoffman | |
| 6,312,049 B1 * | 11/2001 | Sullivan | B60N 2/0232 297/216.1 |
| 6,394,393 B1 | 5/2002 | Mort | |
| 6,409,243 B1 | 6/2002 | Hansen | |
| 6,450,449 B1 | 9/2002 | Podob et al. | |
| 6,672,575 B2 | 1/2004 | Flower et al. | |
| 6,820,931 B2 | 11/2004 | Ruff et al. | |
| 6,910,558 B2 | 6/2005 | Wang et al. | |
| 7,008,015 B2 | 3/2006 | Bischoff | |
| 7,100,885 B2 | 9/2006 | Zerner | |
| 7,328,954 B2 | 2/2008 | Sasaki et al. | |
| 7,628,357 B2 | 12/2009 | Mercier et al. | |
| 7,819,469 B2 | 10/2010 | Stevens | |
| 7,938,485 B1 | 5/2011 | Perciballi et al. | |
| 8,162,372 B2 | 4/2012 | Bettencourt et al. | |
| 8,162,374 B2 | 4/2012 | Cantor et al. | |
| 8,342,300 B2 | 1/2013 | Guillon | |
| 8,371,647 B2 | 2/2013 | Ripley | |
| 8,561,748 B1 | 10/2013 | Hahn et al. | |
| 8,690,114 B2 | 4/2014 | Boyarski | |
| 8,714,642 B2 | 5/2014 | Lamparter et al. | |
| 8,939,502 B2 | 1/2015 | Grant et al. | |
| 9,132,753 B1 | 9/2015 | Campbell | |
| 9,132,754 B2 | 9/2015 | Mindel et al. | |
| 9,283,874 B2 | 3/2016 | Mindel et al. | |
| 9,382,008 B2 | 7/2016 | Fornecker | |
| 9,845,028 B2 * | 12/2017 | Kim | B60N 2/42709 |
| 10,562,420 B2 * | 2/2020 | Faruque | B60N 2/42745 |
| 10,618,437 B2 * | 4/2020 | Fukawatase | B60R 22/00 |
| 2004/0025985 A1 | 2/2004 | Van Schoor | |
| 2005/0127730 A1 | 6/2005 | Bischoff | |
| 2006/0011781 A1 | 1/2006 | Knoll et al. | |
| 2008/0156602 A1 | 7/2008 | Hiemenz et al. | |
| 2008/0296946 A1 * | 12/2008 | Reynolds | B60N 2/525 297/284.6 |
| 2009/0045659 A1 | 2/2009 | List et al. | |
| 2009/0085265 A1 | 4/2009 | Lucas et al. | |
| 2010/0170759 A1 | 7/2010 | Guillon | |
| 2010/0270836 A1 | 10/2010 | Mowry et al. | |
| 2010/0301647 A1 | 12/2010 | Carter et al. | |
| 2012/0263616 A1 | 10/2012 | Rosenboom et al. | |
| 2014/0354030 A1 | 12/2014 | Kolb | |
| 2020/0298735 A1 * | 9/2020 | Evans | B60N 2/2362 |

* cited by examiner

ENERGY ATTENUATING VEHICLE SEAT ASSEMBLY

FIELD OF THE DISCLOSURE

This disclosure relates to vehicle seating, and more particularly to energy attenuating vehicle seating to minimize forces on a seat occupant.

BACKGROUND OF THE DISCLOSURE

Energy absorption/dissipation of sudden acceleration/blast events in armored personnel carriers and other armored vehicles has been an ongoing issue. This is especially important with the advent of asymmetric warfare. A simple explosive device buried in a road can incapacitate a vehicle crew and result in loss of battlefield position, materiel and, most irreplaceably, personnel. The issue of pressure wave generation and G force during such an event has been a continuing issue. As solutions are found for yesterday's warfare, the evolving nature of conflict demand, constant refinement and change to ensure crew survivability. There is a continuing need to create an occupant seat that is adapted to minimize the effect of G-force and pressure wave occasioned by IEDs or other battlefield explosives.

SUMMARY OF THE DISCLOSURE

Disclosed is an energy attenuating vehicle seat having a seat back pivotally connected to a seat pan, wherein the seat back and seat and seat pan are independently pivotable. A rotary energy attenuation device extends between longitudinal members of the sat pan and the seat back, and cooperates with a track system along the length of the longitudinal members to dampen forces from impact and sudden acceleration.

Also disclosed is a rotary energy attenuating device having a position adjustment assembly fluidly connected to a static energy setting assembly fluidly connected to an actuator assembly fluidly connected to a weight adjustment system.

Also disclosed is a vehicle using the energy attenuating vehicle seat and/or rotary energy attenuating device.

The energy attenuating vehicle seat has the ability for non-linear travel via a track and the ability to rotate the occupant during an event. This allows for reduction in injury by unloading the spine (zero-G type) and in constrained environments to increase the length and time of energy absorption prior to bottoming out.

Further objects, features and advantages of this invention will become readily apparent to persons skilled in the art after a review of the following description, with reference to the drawings and claims that are appended to and form a part of this specification.

DETAILED DESCRIPTION

Figure 1:
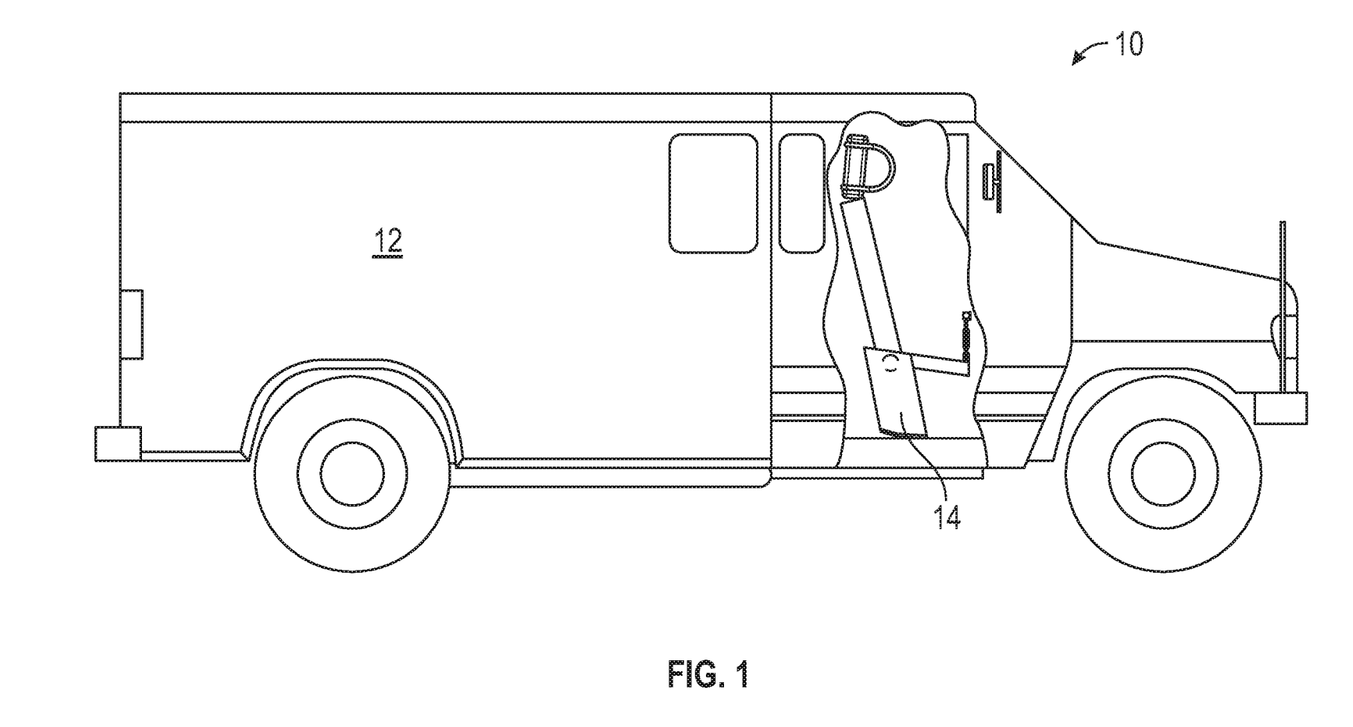
FIG. 1 is a side view of a vehicle equipped with an energy attenuating vehicle seat assembly according to one embodiment of the disclosure.

Turning now to the drawings wherein like numbers refer to like structures, FIG. 1 is a side view of a vehicle 10 with an interior 12 and one embodiment of the energy attenuating seat assembly 14. Such vehicles may have hulls with blast deflection geometries and are generally known in the art. It should be understood that the term "vehicle" should be construed broadly. Moreover, vehicle may be any type of vehicle capable of transporting persons from one location to another. As such, for example, the vehicle 10 could be a wheeled vehicle as shown, but could also be a tracked vehicle, like a tank, an airborne vehicle, such as an airplane or spaceship, an aquatic vehicle, such as a boat or submarine, or rail dependent vehicles, such as a train or amusement park ride. Additionally, it should be understood that while the examples provided in this description show the energy attenuating seat assembly 14 within and interior 12 a vehicle 10, the energy attenuating seat assembly 14 could be used in a variety of different situations, including those situations not involving vehicles. For example, within buildings or vehicle simulations.

Figure 2:
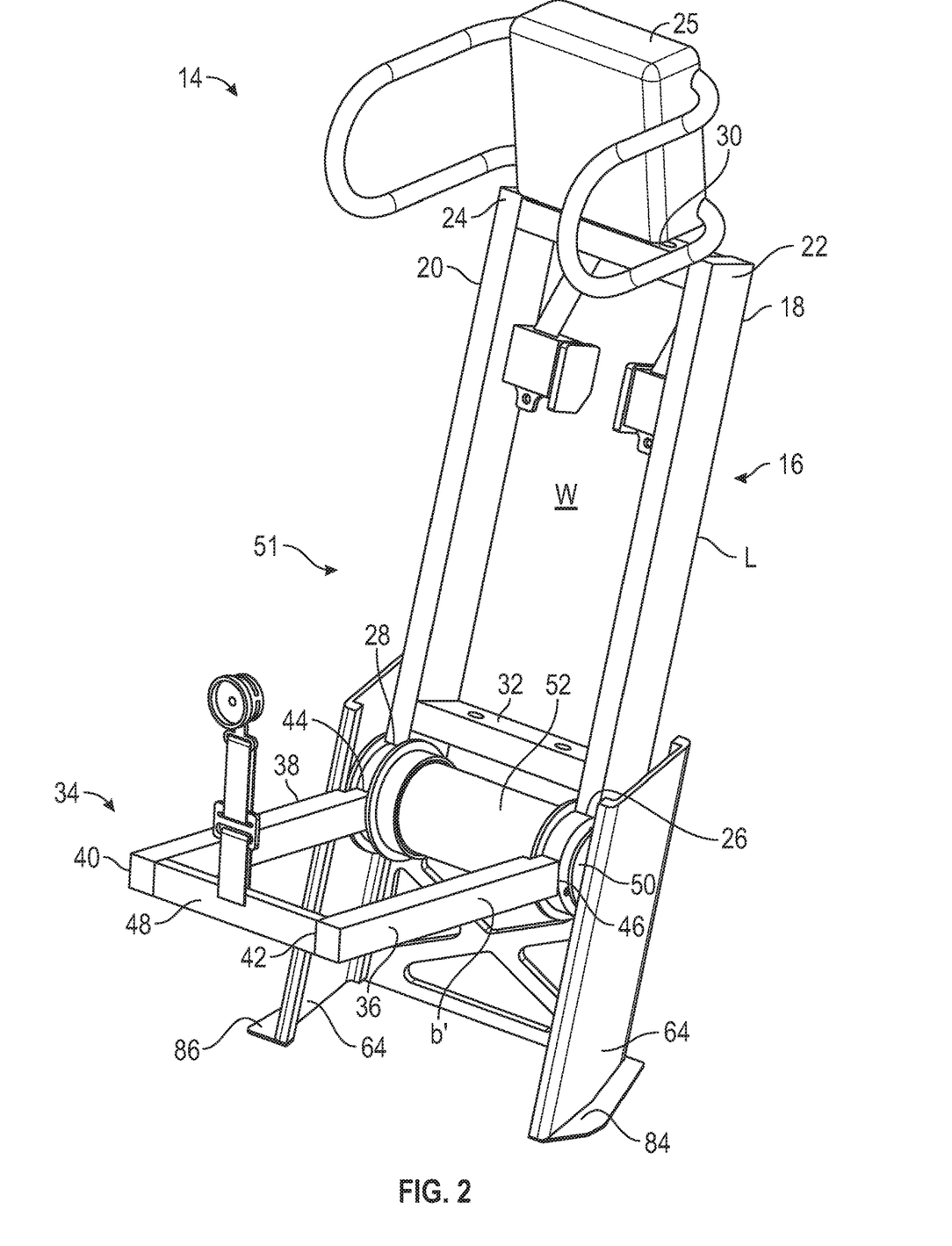
FIG. 2 is a perspective view of one energy attenuating vehicle seat assembly according to one embodiment of the disclosure.
Figure 3:
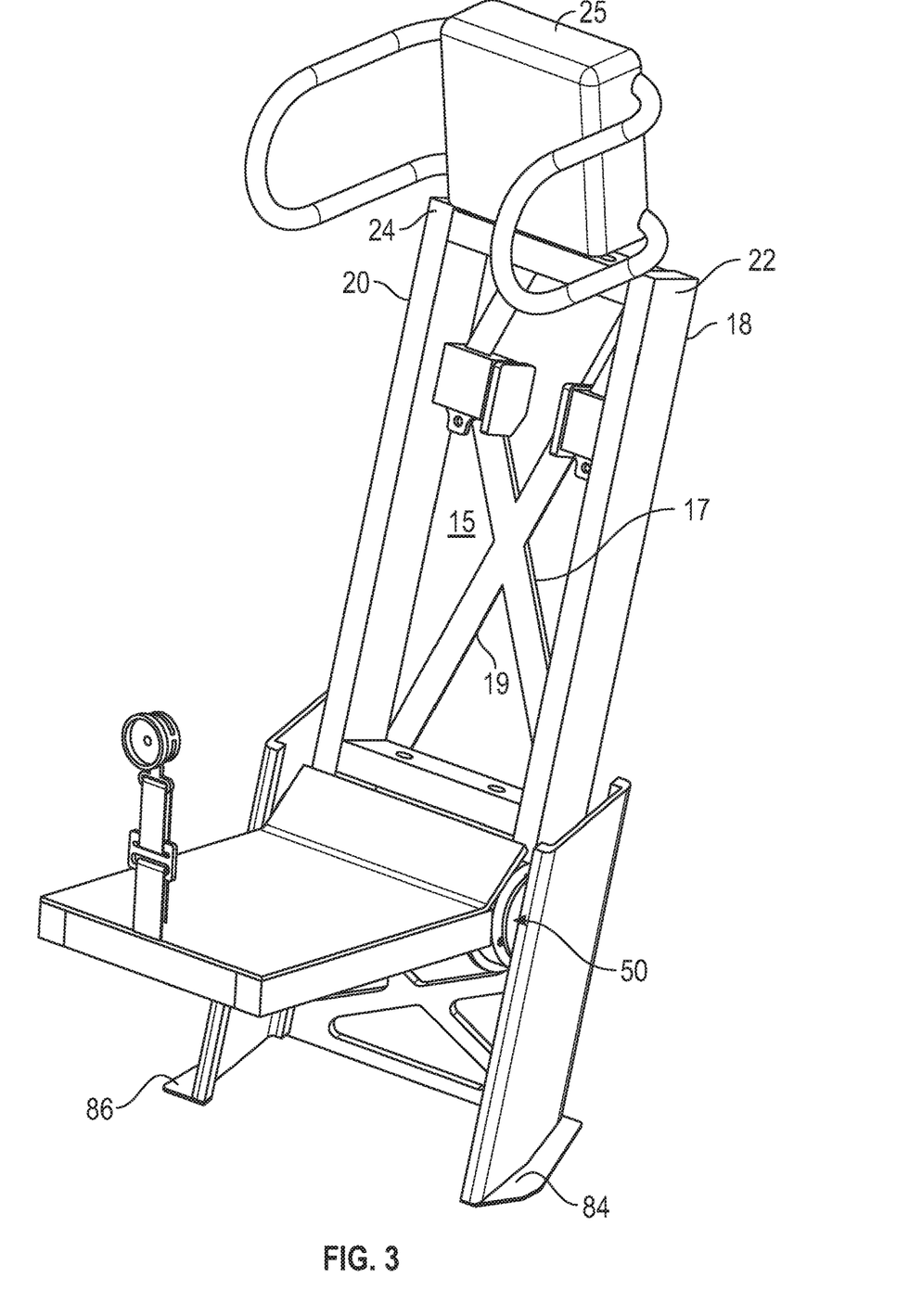
FIG. 3 is a perspective view of the energy attenuating vehicle seat showing a force sensing seat pan.

In FIG. 2 there is shown a perspective view of the energy attenuating seat assembly 14. Seat back 16 is constructed of spaced apart opposed seat back longitudinal members 18 and 20. Longitudinal members 18 and 20 have first ends 22, 24, and second ends 26 and 28, respectively, separated by a length L. First and second transverse members 30 and 32 extend the width W of the seat back to hold the seat back longitudinal members in opposed, spaced apart orientation relative to each other. First transverse member is located substantially proximal to the first ends 22, 24 on the seat back longitudinal members. The first transverse member may be equipped with or support a headrest assembly 25. The second seat back transverse member is located near the second end of the seat back longitudinal member. Optionally, the seat back longitudinal members may have an L channel configuration to present a support surface for a seat back cushion. In the alternative, the seat back assembly may be equipped with cross members 17 and 19 to create a seat back support structure 15, as seen in FIG. 3.

The seat pan 34 is composed of seat pan longitudinal members 36 and 38 in opposed, spaced apart relation to each other. The seat pan longitudinal members have a first end 40, 42, respectively, and second end 44, 46 separated by a length L'. A seat pan transverse member 48 is located adjacent to the seat pan longitudinal member first ends and extend therebetween to hold the seat pan longitudinal members in opposed, spaced apart relation relative to each other.

Both the seat back longitudinal member and the seat pan longitudinal member second ends include a pivot 50. The seat back and seat pan longitudinal members each pivotally connect with a rotary energy attenuating device 52 at their second ends to form a vehicle energy attenuating seat assembly frame 51.

Figures 4A, 4B:
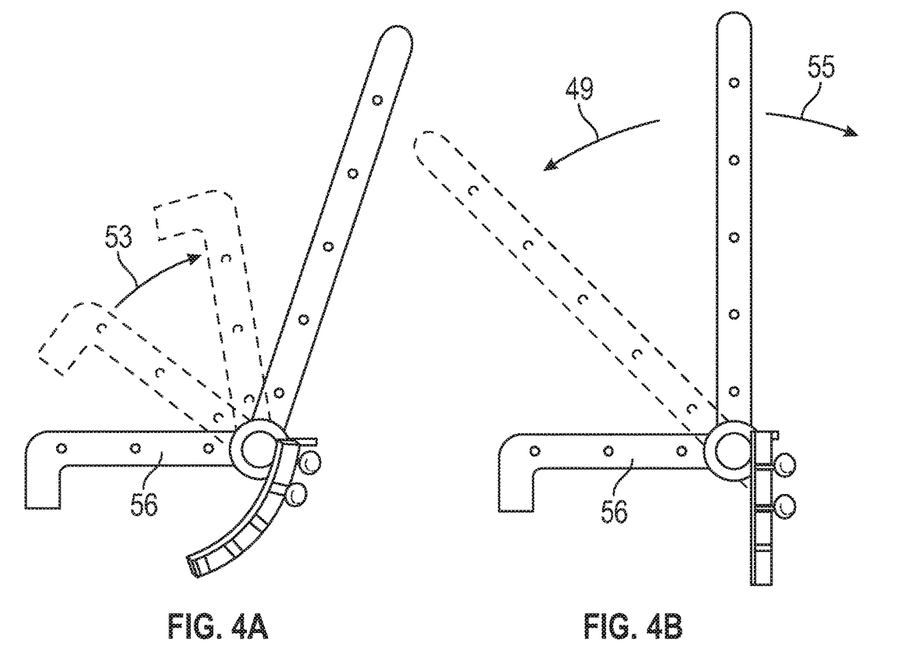
FIG. 4A is a side view of the energy attenuating vehicle seat showing independently pivotal seat back relative to the seat pan.
FIG. 4B is a side view of the energy attenuating vehicle seat showing independently pivoting seat pan relative to the seat back.

As may be seen in FIGS. 4A and 4B, the seat pan and the seat back are independently pivotable relative to each other. For example, the seat pan may be pivoted toward the seat back in direction 53, or the seat back may be pivotal relative to the seat pan in a direction 49 toward the seat pan 34 and in a direction 55 away from the seat pan 34. The ability of the seat pan and/or the seat back to move in a nonlinear direction help significantly in space constrained environments, such as vehicles utilized to transport troops.

Furthermore, as stated previously, the seat pan in the seat back are independently pivotable relative to one another. In one implementation, the seat back may be pivoted in a direction 55 away from the seat pan 34, so as to put the seat back and the seat pan 34 in line with each other. Essentially, by placing the seat back and the seat pan 34 in line with each other, a substantially flat surface is created. This type of configuration allows an occupant to lay substantially flat. As such, when placed in this configuration, the vehicle seat assembly can act as a better stretcher for allowing the occupant to more comfortably rest or for transporting an occupant that has been injured.

Figure 5:
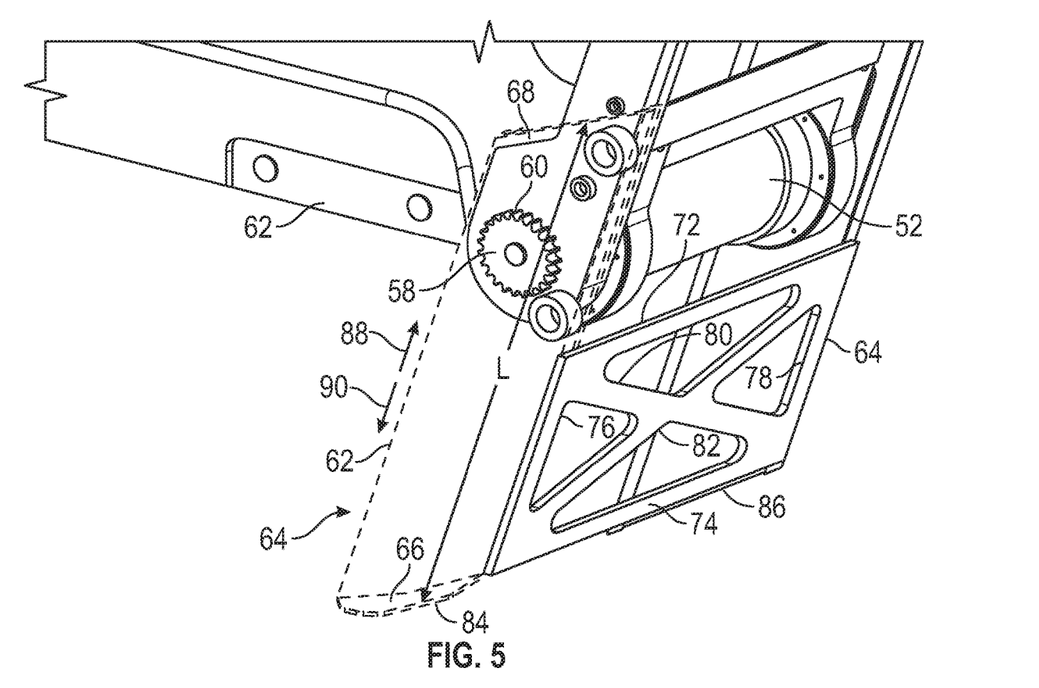
FIG. 5 is a detailed view of the energy attenuating vehicle seat assembly showing a geared rotary energy attenuator in a track in longitudinal rails.

FIG. 5 is a detailed view of a seat showing a geared energy attenuating unit self-contained in a rail system within the vehicle seat architecture. Specifically, the Energy Attenuating Unit 52, as seen in FIGS. 1-4 is located at the pivot of the seat pan and the seat back of the seat assembly. The Energy Attenuating unit (EA) 52 may be equipped with gear 58 located at least at one end of the EA. The gear 58 has teeth 60 that interact with and cooperatively engage with the toothed rack 62 in the spaced apart opposed vehicle seat rail members 64. Each rail member has opposed first and second ends 66, 68, respectively, and a length L extending therebetween. The rail members may be equipped with structural transverse members 72 and 74, longitudinal members 76 and 78, and cross members 80 and 82 to impart rigidity to the rail members and thereby to the seat assembly. Mounting flanges 84 and 86 may be provided to assist mounting the rails to the vehicle.

Figure 6:
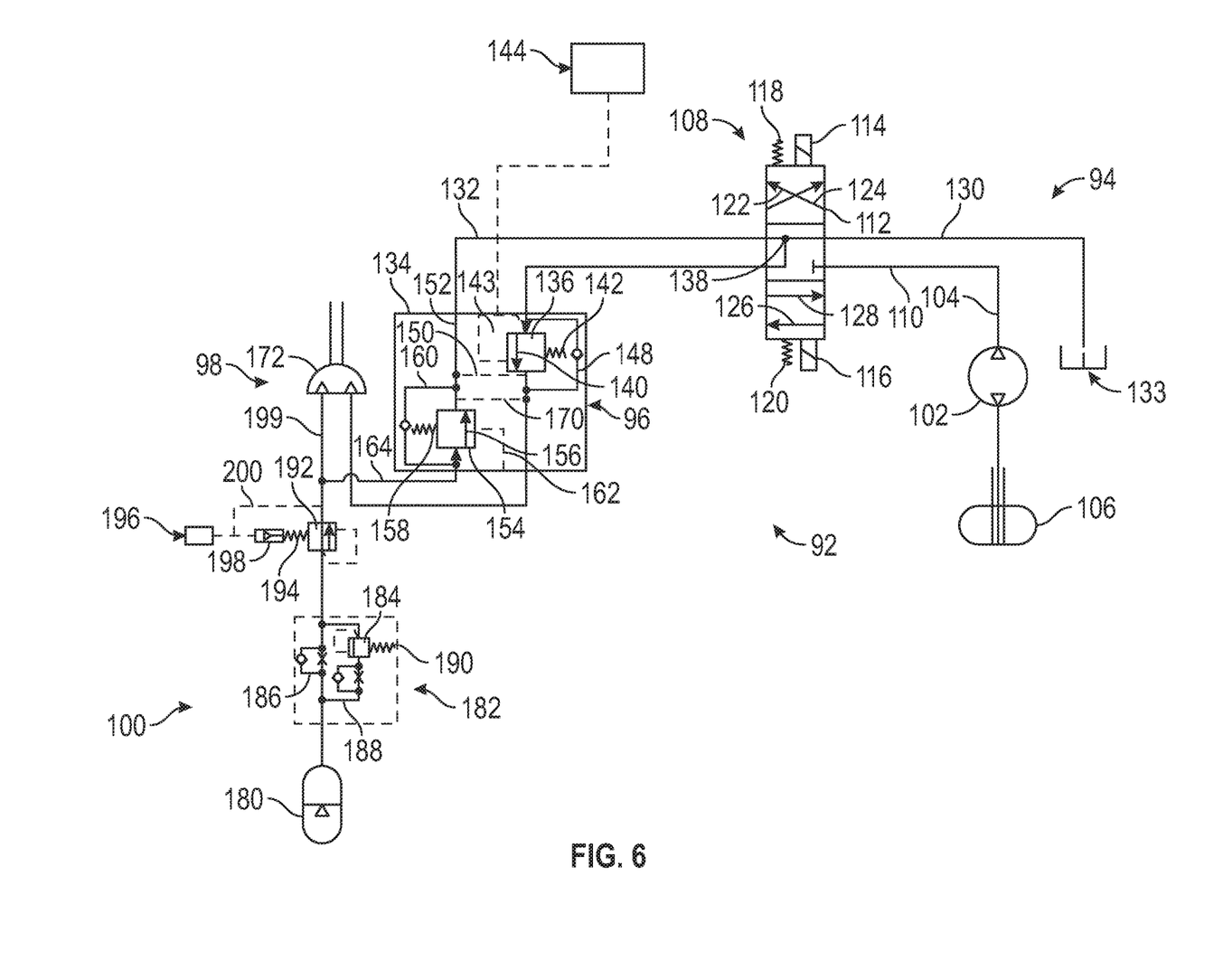
FIG. 6 is a schematic representation of the rotary energy attenuating device showing its internal components and fluid flow circuit.

At least one rail member is equipped with a track system along substantially its length and the rotary energy attenuation device is engaged at its first or second end with the vehicle seat rail member track system. When activated either manually or in a powered mode, the EA engages the track system and moves the seat assembly in an upward direction 88 or a downward direction 90 so that the seat is adjustable to accommodate most persons. By actuating the EA, the energy attenuating vehicle seat back and seat pan responsively move along the vehicle seat rail member length to any desired position and nonlinear motion. The energy attenuating vehicle seat may have the ability for non-linear travel via a track and the ability to rotate the occupant during an event. This allows for reduction in injury by unloading the spine (zero-G type) and in constrained environments to increase the length and time of energy absorption prior to bottoming out FIG. 6 is a schematic of the rotary EA 52, showing fluid circuit 92. The fluid may be any fluid, and is described herein as hydraulic fluid for description purposes only. Furthermore, while a fluid circuit 92 is utilized for the rotary EA 52, it should be understood that other technologies may be utilized. For example, instead of utilizing a hydraulic fluid circuit, the circuit could be a pneumatic circuit. Additionally, instead of utilizing a hydraulic or pneumatic circuit, a mechanical or rotary damper or more motors, such as an electrical motor, could be utilized. As depicted, the rotary EA device circuit has a seat adjustment assembly 94, a static energy setting assembly 96, an actuator assembly 98 and an occupant adjustment system 100. These will be described separately.

Turning to the seat adjustment assembly 94, it can be seen that, in this embodiment, the seat adjustment assembly may be equipped with a bi-directional pump 102 that may direct fluid in a fluid passageway 104 toward or away from a fluid reservoir 106 to a 4-way, 3 position directional valve 108 along a fluid passage 110. The 4-way, 3 position directional valve 108 may be the body 112 of the rotary EA 52. Shafts 114 and 116 carry toothed gears 58 on the rotary EA. The valve 108 is pressure controlled. Coil springs 118 and 120 are preset to exert a certain pressure on the valve. When the coil springs are overcome by the fluid pressure in the valve, the fluid moves in directions 122 and 124, and/or 126 and 128 and the gear 58 on the shafts 114 and 116 are rotated along toothed rack 62. The 4-way, 3 position directional valve is also fluidly connected at 130 to an overflow tank 133.

Turning now to the static energy setting assembly, there is shown a damper assembly 134 that is velocity sensitive and may be either passively or actively controlled. Specifically, first directional velocity sensitive pressure relief valve 136 is fluidly connected to the 4-way, 3 position directional valve 108 at junction 138 along fluid connection 132. The fluid is pumped from the 4-way 3 position directional valve into the first direction velocity sensitive pressure relief valve 136 in direction 140. The valve 136 may be passively controlled by biaser 142 which may be a coil spring. When the coil spring is overcome, fluid moves in a direction 140. If the fluid pressure is not sufficient to actuated valve 136, a fluid bypass circuit 148 is provided to permit fluid to move around valve 136. Another fluid circuit 150 may be provided to fluidly connect valve 136 with a return fluid circuit 152 that connects with the 4-way 3 position directional valve and either recirculate back to the valve 136 or into the overflow tank. The valve 136 may further be actively controlled, as by an electronic circuit 143, which is electronically connected to a control module 144. When activated, the valve 136 opens to receive fluid from valve 108 in a direction 140. The static energy setting assembly is further equipped with a second return direction velocity sensitive pressure relief valve 154 in direction 156 which is opposite to the direction of valve 136. Similar with valve 136, valve 154 may be passively controlled and has a biaser 158 that is shown as a coil spring. When the fluid pressure exceeds the force of the biaser, the valve opens and the fluid is moved along direction 156 to the 4-way 3 position directional valve along fluid passage 152 toward fluid passage 132. If the fluid pressure is not sufficient to actuate valve 154, a fluid bypass circuit 160 is provided to permit fluid to move around valve 154. Another fluid circuit 170 may be provided to fluidly connect valve 154 with a return fluid circuit 152. A bypass circuit valve 154 is also actively controllable, as by an electronic circuit 162, which is electronically connected to a control module 144. When activated, the valve 154 opens to receive fluid from the actuator adjustment system along a fluid connection 164.

The rotary actuator is a directional pump 172 wherein fluid from the valve 136 is directed for circulation within the fluid circuit 100. The pump 172 has a range of output acceptable to the user, and may be in the range of 1.5 inches.

The occupant adjustment system 100 includes an accumulator pump 180 having an output sufficient to move fluid through the entire system, and, in this embodiment, has an output of about 47.5 inches. The accumulator is fluidly connected to an acceleration sensitive return assembly 182, including at least one, one-way valve 184, with bypasses 186 and 188, respectively. The one-way valve 184 may be passive, that is, may include a biaser 190, which may be a spring. When the fluid pressure overcomes the force of the spring, the valve opens. Also, the one-way valve 184 may also be electronically active, and open upon command of the controller. The bypass circuits 186 and 188 may further be equipped with accelerometers that control the valve 184.

When the accelerometer senses the present acceleration, the valve is activated and fluid flows through the valve in the fluid circuit. The occupant adjustment system further includes a one-way pilot/spring valve 192, fluidly connected to the accumulator and one-way valve assembly. The pilot valve may be passive, and equipped with a biaser 194 shown as a coil spring, which, when overcome by the fluid force, opens the valve and allows fluid to flow to the static seat assembly and thence to the 4-way, 3 position directional valve. In addition fluid can flow to a load sensor 196 through valve 198 which may be passive or active, located in the seat pan of the seat assembly. A bypass fluid circuit 200 is also provided to permit fluid to flow to the load sensor in the seat pan.

Describing now the flow of fluid through the system as described, the bidirectional pump 102 directs fluid through fluid connection 110 to the 4-way, 3 position directional valve 108 to lift the seat and otherwise adjust it for an occupant. The flow of fluid through the 4-way, 3 position directional valve permits the EA gear to rotate and engage with the toothed rack in the longitudinal members to set the seat position. Fluid from the 4-way, 3 position directional valve flows through fluid connection 132 into a static energy setting assembly 96. The fluid passes through a one-way pressure sensitive and/or actively controlled valve 136 in the direction of arrow 140 and from there, to the hydraulic rotary actuator 172. The hydraulic rotary actuator forces the fluid to travel at a predetermined flow to an accumulator 180 in the occupant adjustment system 100. The accumulator moves the fluid through fluid connections to an acceleration sensitive return, one-way valve assembly that may be passive or actively controlled. The fluid passes through the one-way valve assembly to a pilot spring valve 194, which itself may be passively or actively controlled. When a biaser to overcome, as if by acceleration due to sudden impact or explosive event, fluid flows through the pilot spring valve to a load sensor in the seat pan response. A certain amount of fluid flows from the pilot spring valve through fluid connection 199 to the hydraulic rotary accumulator for recirculation and some fluid flows through fluid connection 164 to a one-way relief valve 154 in the static seating assembly and thence through fluid connection 130 back to the 4-way, 3 position directional valve. Excess fluid may be directed through the 4-way, 3 position directional valve through fluid connection 130 to the reservoir tank 133.

The occupant adjustment system 100 has the ability to automatically reset during events with the same breakaway load. The return assembly 182 essentially allows the occupant adjustment system 100 to reset so as to be ready for another event. So, after initial event, the occupant adjustment system 100 is able to reset, so as to be ready for a secondary event. The initial event could be an explosion raising the vehicle above the ground, while the secondary event could be the impact of the vehicle crashing into the ground.

The seat as described may be modular as well. For example, the seat architecture or configuration could be expanded to accommodate different coverings, or seat features. For example, the seat back could be equipped with a camel back pocket to offer a more secure fit with an occupant. The seat pan could be equipped with a passive/active load sensor, such as, for example a fluid fillable seat bladder that responds to force by managing the amount of fluid in the bladder to minimize the G force, acceleration, or pressure wave experienced by the occupant in the seat during an explosion event. The headrest assembly 25 may also be modular, as well as a foot rest or side rails on the seat. Thus, the seat is extremely versatile and one frame may be modified to accommodate a number of different design parameters.

While various embodiments and configurations have been discussed, it is understood that the examples provided are not exhaustive. The words used to describe the embodiments are words of description and not words of limitation without departing from the scope and spirit of the invention as set forth in the appended claims.

What is claimed is:

1. An energy attenuating seat, comprising:
   a seat back pivotally connected to a seat pan, the seat back and the seat pan independently pivotal relative to each other;
   the seat back including spaced apart seat back longitudinal members, each of the seat back longitudinal members having a length and opposed first and second ends, and at least one seat back transverse member extending between the seatback longitudinal members;
   the seat pan including spaced apart seat pan longitudinal members, each of the seat pan longitudinal members having a length and opposed first and second ends, and at least one seat pan transverse member extending between the seat pan longitudinal members;
   a rotary energy attenuation device terminating in a first end and a second end, the rotary energy attenuation device extending between the seat back longitudinal members and the seat pan longitudinal members, the rotary energy attenuation device pivotally attached to the seat pan longitudinal members at the second ends of the seat pan longitudinal members and pivotally attached to the seat back longitudinal members at the second ends of the seat back longitudinal members;
   spaced apart opposed seat rail members, each seat rail member having opposed first and second ends and a length extending therebetween; and
   at least one of the seat rail members equipped with a track system, the rotary energy attenuation device engaged with the seat rail member track system, the seat back and seat pan responsively moveable along the length of the rail members.

2. The energy attenuating seat of claim 1, further comprising the seat back and seat pan are moveable along the seat rail member length responsive to a height adjustment.

3. The energy attenuating seat of claim 1, further comprising the seat back and the seat pan are moveable along the seat rail member length responsive to a dynamic event including a collision or a blast event.

4. The energy attenuating seat of claim 1, further comprising the seat back and the seat pan are moveable from an initial position along the seat rail member length responsive to a dynamic event and resettable to the initial position after the dynamic event has occurred.

5. The energy attenuating seat of claim 1, further comprising the seat back and the seat pan are rotatable responsive to a dynamic event.

6. An energy attenuating seat, comprising:
- a seat back pivotally connected to a seat pan, the seat back and the seat pan independently pivotal relative to each other;
- the seat back including spaced apart seat back longitudinal members, each of the seat back longitudinal members having a length and opposed first and second ends, and at least one seat back transverse member extending between the seatback longitudinal members;
- the seat pan including spaced apart seat pan longitudinal members, each of the seat pan longitudinal members having a length and opposed first and second ends, and at least one seat pan transverse member extending between the seat pan longitudinal members;
- a rotary energy attenuation device terminating in a first end and a second end, the rotary energy attenuation device extending between the seat back longitudinal members and the seat pan longitudinal members, the rotary energy attenuation device pivotally attached to the seat pan longitudinal members at the second ends of the seat pan longitudinal members and pivotally attached to the seat back longitudinal members at the second ends of the seat back longitudinal members;
- spaced apart opposed seat rail members, each seat rail member having opposed first and second ends and a length extending therebetween; and
- at least one of the seat rail members equipped with a track system, the rotary energy attenuation device engaged with the seat rail member track system, the seat back and seat pan responsively moveable along the length of the rail members,
wherein the seat pan is equipped with a self-adjusting, occupant weight dependent damping system.

7. The energy attenuating seat of claim 6, further comprising the occupant weight dependent damping system is passive.

8. The energy attenuating seat of claim 6, further comprising the occupant weight dependent damping system is active.

9. The energy attenuating seat assembly of claim 6, further comprising the occupant weight dependent damping system includes an accumulator pump assembly fluidly connected to an acceleration sensitive return assembly, the acceleration sensitive return assembly fluidly connected to a pilot/spring valve, the pilot/spring valve fluidly connected to a load sensor in the seat pan and the second pressure sensitive relief valve in a static energy attenuation system.

10. The energy attenuating seat assembly of claim 9, further comprising a one-way valve assembly system includes at least a first, second and third one-way valve, the valves fluidly connected to each other and the accumulator pump assembly.

11. An energy attenuating seat, comprising:
- a seat back pivotally connected to a seat pan, the seat back and the seat pan independently pivotal relative to each other;
- the seat back including spaced apart seat back longitudinal members, each of the seat back longitudinal members having a length and opposed first and second ends, and at least one seat back transverse member extending between the seatback longitudinal members;
- the seat pan including spaced apart seat pan longitudinal members, each of the seat pan longitudinal members having a length and opposed first and second ends, and at least one seat pan transverse member extending between the seat pan longitudinal members;
- a rotary energy attenuation device terminating in a first end and a second end, the rotary energy attenuation device extending between the seat back longitudinal members and the seat pan longitudinal members, the rotary energy attenuation device pivotally attached to the seat pan longitudinal members at the second ends of the seat pan longitudinal members and pivotally attached to the seat back longitudinal members at the second ends of the seat back longitudinal members;
- spaced apart opposed seat rail members, each seat rail member having opposed first and second ends and a length extending therebetween; and
- at least one of the seat rail members equipped with a track system, the rotary energy attenuation device engaged with the seat rail member track system, the seat back and seat pan responsively moveable along the length of the rail members,
    - wherein the rotary energy attenuating device comprises:
    - a seat position adjustment assembly fluidly connected to a static energy setting assembly;
    - the static energy setting assembly fluidly connected to an actuator assembly; and
- the actuator assembly fluidly connected to an occupant weight adjustment system.

12. The energy attenuating seat of claim 11, further comprising the seat position adjustment assembly includes a bi-directional pump fluidly connected to a 4-way, three position directional valve and a fluid reservoir; the 4-way, three position directional valve further fluidly connected to an overflow.

13. The energy attenuating seat of claim 11, further comprising:
- the static energy setting assembly includes at least one damper assembly, the damper assembly including at least first and second velocity sensitive pressure relief valves; the pressure sensitive relief valves having opposed fluid flow directions;
- the first velocity sensitive pressure relief valve having a fluid circuit connected to the 4-way, three position directional valve and directing a fluid flow to the rotary energy attenuation device; the first pressure sensitive pressure relief valve fluid circuit further having a controllable bypass fluid circuit;
- the second pressure sensitive relief valve having a fluid circuit fluidly connected to the occupant weight adjustment system; and directing fluid flow to the 4-way, three position directional valve;
- the second pressure sensitive relief valve fluid circuit further equipped with a controllable bypass circuit; and
- each of the first and the second pressure sensitive relief valves equipped with a preset biaser to control the first and the second valves passively, and an electronic controller to actively control the fluid flow bypass.

14. The energy attenuating seat assembly of claim 13, further comprising the biaser is a coil spring, the coil spring having a predetermined tension.

15. An energy attenuating seat, comprising:
- a seat back pivotally connected to a seat pan, the seat back and the seat pan independently pivotal relative to each other;
- the seat back including spaced apart seat back longitudinal members, each of the seat back longitudinal members having a length and opposed first and second ends, and at least one seat back transverse member extending between the seatback longitudinal members;
- the seat pan including spaced apart seat pan longitudinal members, each of the seat pan longitudinal members having a length and opposed first and second ends, and at least one seat pan transverse member extending between the seat pan longitudinal members;

a rotary energy attenuation device terminating in a first end and a second end, the rotary energy attenuation device extending between the seat back longitudinal members and the seat pan longitudinal members, the rotary energy attenuation device pivotally attached to the seat pan longitudinal members at the second ends of the seat pan longitudinal members and pivotally attached to the seat back longitudinal members at the second ends of the seat back longitudinal members;

spaced apart opposed seat rail members, each seat rail member having opposed first and second ends and a length extending therebetween; and at least one of the seat rail members equipped with a track system, the rotary energy attenuation device engaged with the seat rail member track system, the seat back and seat pan responsively moveable along the length of the rail members,
  wherein a seat adjustment assembly includes a gear engagement with the track system, the gear engagement with the track system damped by a fluid in response to a sudden acceleration.

16. The energy attenuating seat of claim 15, further comprising the fluid is hydraulic.

17. A vehicle, comprising:
a body, the body equipped with an energy attenuating vehicle seat, the vehicle seat including a seat back pivotally connected to a seat pan, the seat back and the seat pan independently pivotal relative to each other;
the seat back including spaced apart seat back longitudinal members, each of the seat back longitudinal members having a length and opposed first and second ends, and at least one seat back transverse member extending between the seatback longitudinal members, respectively;
the seat pan including spaced apart seat pan longitudinal members, each of the seat pan longitudinal members having a length and opposed first and second ends, and at least one transverse member extending between to the seat pan longitudinal members;
a rotary energy attenuation device terminating in a first end and a second end and extending between the seat back longitudinal members and the seat pan longitudinal members, the rotary energy attenuation device pivotally attached to the seat pan longitudinal members the second ends of the seat pan longitudinal members and pivotally attached to the seat back longitudinal members at the second ends of the seat back longitudinal members;
spaced apart opposed vehicle seat rail members, each of the vehicle seat rail members having opposed first and second ends and a length extending there between therebetween; and
at least one of the rail members equipped with a track system, the rotary energy attenuation device engaged with the vehicle seat rail member track system, the seat back and seat pan responsively moveable along the rail member track system.

18. The vehicle of claim 17, further comprising the seat back and the seat pan are moveable along the vehicle seat rail members responsive to a dynamic event.

19. The vehicle of claim 18, further comprising the dynamic event is a vehicle collision or blast event of a sufficient threshold magnitude.

20. A vehicle, comprising:
a body, the body equipped with an energy attenuating vehicle seat, the vehicle seat including a seat back pivotally connected to a seat pan, the seat back and the seat pan independently pivotal relative to each other;
the seat back including spaced apart seat back longitudinal members, each of the seat back longitudinal members having a length and opposed first and second ends, and at least one seat back transverse member extending between the seatback longitudinal members, respectively;
the seat pan including spaced apart seat pan longitudinal members, each of the seat pan longitudinal members having a length and opposed first and second ends, and at least one transverse member extending between to the seat pan longitudinal members;
a rotary energy attenuation device terminating in a first end and a second end and extending between the seat back longitudinal members and the seat pan longitudinal members, the rotary energy attenuation device pivotally attached to the seat pan longitudinal members at the second ends of the seat pan longitudinal members and pivotally attached to the seat back longitudinal members at the second ends of the seat back longitudinal members;
spaced apart opposed vehicle seat rail members, each of the vehicle seat rail members having opposed first and second ends and a length extending there between therebetween; and
at least one of the rail members equipped with a track system, the rotary energy attenuation device engaged with the vehicle seat rail member track system, the seat back and seat pan responsively moveable along the rail member track system,
wherein the seat back and the seat pan are moveable along the vehicle seat rail member length responsive to a height adjustment.

21. A vehicle, comprising:
a body, the body equipped with an energy attenuating vehicle seat, the vehicle seat including a seat back pivotally connected to a seat pan, the seat back and the seat pan independently pivotal relative to each other;
the seat back including spaced apart seat back longitudinal members, each of the seat back longitudinal members having a length and opposed first and second ends, and at least one seat back transverse member extending between the seatback longitudinal members, respectively;
the seat pan including spaced apart seat pan longitudinal members, each of the seat pan longitudinal members having a length and opposed first and second ends, and at least one transverse member extending between to the seat pan longitudinal members;
a rotary energy attenuation device terminating in a first end and a second end and extending between the seat back longitudinal members and the seat pan longitudinal members, the rotary energy attenuation device pivotally attached to the seat pan longitudinal members at the second ends of the seat pan longitudinal members and pivotally attached to the seat back longitudinal members at the second ends of the seat back longitudinal members;
spaced apart opposed vehicle seat rail members, each of the vehicle seat rail members having opposed first and second ends and a length extending there between therebetween; and
at least one of the rail members equipped with a track system, the rotary energy attenuation device engaged with the vehicle seat rail member track system, the seat back and seat pan responsively moveable along the rail member track system, wherein the seat pan is equipped with a self-adjusting, occupant weight dependent, preset damping system.

22. The vehicle of claim 21, further comprising the occupant weight dependent preset damping system is passive.

23. The vehicle of claim 21, further comprising the occupant weight dependent preset damping system is active.

24. A vehicle, comprising:
a body, the body equipped with an energy attenuating vehicle seat, the vehicle seat including a seat back pivotally connected to a seat pan, the seat back and the seat pan independently pivotal relative to each other;
the seat back including spaced apart seat back longitudinal members, each of the seat back longitudinal members having a length and opposed first and second ends, and at least one seat back transverse member extending between the seatback longitudinal members, respectively;
the seat pan including spaced apart seat pan longitudinal members, each of the seat pan longitudinal members having a length and opposed first and second ends, and at least one transverse member extending between to the seat pan longitudinal members;
a rotary energy attenuation device terminating in a first end and a second end and extending between the seat back longitudinal members and the seat pan longitudinal members, the rotary energy attenuation device pivotally attached to the seat pan longitudinal members at the second ends of the seat pan longitudinal members and pivotally attached to the seat back longitudinal members at the second ends of the seat back longitudinal members;
spaced apart opposed vehicle seat rail members, each of the vehicle seat rail members having opposed first and second ends and a length extending there between therebetween; and
at least one of the rail members equipped with a track system, the rotary energy attenuation device engaged with the vehicle seat rail member track system, the seat back and seat pan responsively moveable along the rail member track system,
wherein the rotary energy attenuating device acts as a seat height adjustor.

25. A vehicle, comprising:
a body, the body equipped with an energy attenuating vehicle seat, the vehicle seat including a seat back pivotally connected to a seat pan, the seat back and the seat pan independently pivotal relative to each other;
the seat back including spaced apart seat back longitudinal members, each of the seat back longitudinal members having a length and opposed first and second ends, and at least one seat back transverse member extending between the seatback longitudinal members, respectively;
the seat pan including spaced apart seat pan longitudinal members, each of the seat pan longitudinal members having a length and opposed first and second ends, and at least one transverse member extending between to the seat pan longitudinal members;
a rotary energy attenuation device terminating in a first end and a second end and extending between the seat back longitudinal members and the seat pan longitudinal members, the rotary energy attenuation device pivotally attached to the seat pan longitudinal members at the second ends of the seat pan longitudinal members and pivotally attached to the seat back longitudinal members at the second ends of the seat back longitudinal members;
spaced apart opposed vehicle seat rail members, each of the vehicle seat rail members having opposed first and second ends and a length extending there between therebetween; and
at least one of the rail members equipped with a track system, the rotary energy attenuation device engaged with the vehicle seat rail member track system, the seat back and seat pan responsively moveable along the rail member track system,
wherein the rotary energy attenuating device comprises a seat position adjustment assembly fluidly connected to a static energy setting assembly, the static energy assembly fluidly connected to an actuator assembly, the actuator assembly fluidly connected to an occupant weight adjustment system.

26. The vehicle of claim 25, further comprising the seat position adjustment assembly includes a bi-directional pump fluidly connected to a 4-way, three position directional valve and a fluid reservoir, the 4-way, three position directional valve further fluidly connected to an overflow.

27. The vehicle of claim 25, further comprising the static energy setting assembly includes at least one damper assembly, the damper assembly including at least a first and a second velocity sensitive pressure relief valves, the first and second pressure sensitive relief valves having opposed fluid flow directions, the first velocity sensitive pressure relief valve having a fluid circuit connected to the 4-way, three position directional valve and directing a fluid flow to the rotary energy attenuation assembly, the first pressure sensitive pressure relief valve fluid circuit further having a controllable bypass fluid circuit, the second pressure sensitive relief valve having a fluid circuit fluidly connected to the occupant weight adjustment system, and directing fluid flow to the 4-way, three position directional valve, the second pressure sensitive relief valve fluid circuit further equipped with a controllable bypass circuit, each of the first and second pressure sensitive relief valves equipped with a preset biaser to control the pressure relief valves passively, and an electronic controller to actively control the valves.

28. The vehicle of claim 27 further comprising the biaser is a coil spring.

29. The vehicle of claim 25 further comprising the actuator assembly is a directional pump.

30. The vehicle of claim 25 further comprising the occupant weight adjustment system includes an accumulator pump assembly fluidly connected to an acceleration sensitive return assembly, the acceleration sensitive return assembly fluidly connected to a pilot/spring valve, the pilot/spring valve fluidly connected to a load sensor in the seat pan and the second pressure sensitive relief valve in the static energy attenuation system.

31. The vehicle of claim 30 further comprising the acceleration sensitive return assembly includes a one-way valve assembly system.

32. The vehicle of claim 31 further comprising the one-way valve assembly system includes at least a first, a second and a third one-way valve, the valves fluidly connected to each other and the accumulator pump assembly.

33. The vehicle of claim 25 further comprising the position adjustment assembly includes a gear engagement with the track system, the gear engagement with the track system damped by the fluid in response to a sudden acceleration.

34. The vehicle of claim 25 further comprising the fluid is a hydraulic fluid.

* * * * *